United States Patent [19]

Schmed et al.

[11] Patent Number: 4,681,028
[45] Date of Patent: Jul. 21, 1987

[54] APPARATUS FOR THE PREPARATION OF HOT BEVERAGES, PARTICULARLY A COFFEE MACHINE

[75] Inventors: Arthur Schmed, Oberdürnten; Hans-Peter Frei, Oetwil am See, both of Switzerland

[73] Assignee: Gesamat AG, Ballwil, Switzerland

[21] Appl. No.: 705,519

[22] Filed: Feb. 26, 1985

[30] Foreign Application Priority Data

Feb. 27, 1984 [DE] Fed. Rep. of Germany ....... 3407030

[51] Int. Cl.$^4$ .............................................. A47J 31/00
[52] U.S. Cl. ................... 99/289 R; 99/302 R
[58] Field of Search ............ 99/289 R, 289 D, 289 P, 99/297, 286, 300, 302 R, 304, 307, 287; 426/433

[56] References Cited

U.S. PATENT DOCUMENTS

| | | | |
|---|---|---|---|
| 3,369,478 | 2/1968 | Black | 99/289 |
| 3,552,976 | 1/1971 | King | 99/289 |
| 3,593,649 | 7/1971 | Novi | 99/289 |
| 4,457,216 | 7/1984 | Dremmel | 99/289 R |

FOREIGN PATENT DOCUMENTS 725013  1/1966  Canada ............................. 99/289 R

*Primary Examiner*—Robert W. Jenkins
*Attorney, Agent, or Firm*—Reed Smith Shaw & McClay

[57] ABSTRACT

The invention provides a coffee machine, with a housing, a fresh water supply reservoir mounted therein, a heating means adapted to heat the fresh water and a feeding pump to supply the heated fresh water to a brewing chamber under pressure. The brewing chamber comprises a closure means and an inlet for coffee powder as well as an outlet for coffee. If appropriate, an installation for pushing out and removing, respectively, the leached-out coffee powder out of the brewing chamber and from the brewing chamber, respectively, may be provided. All parts of the apparatus which are subjected to contamination by the coffee powder or by the coffee, namely the brewing chamber, the closure element, the coffee powder inlet, the coffee outlet and eventually the installation for pushing-out and removing the coffee powder, are combined to a modular unit, which is removably inserted into the housing of the apparatus. The remaining parts, particularly the water reservoir, the heater and the pump as well as the required driving, control and operating elements are fixedly installed in the housing and are adapted to be operatively coupled to the modular unit upon insertion thereof into the housing. Thereby the contaminated parts can be cleaned easily and without danger, since the modular unit can be pulled out of the apparatus and rinsed as a whole.

11 Claims, 5 Drawing Figures

APPARATUS FOR THE PREPARATION OF HOT BEVERAGES, PARTICULARLY A COFFEE MACHINE

BACKGROUND OF THE INVENTION

1. Field of the Invention

The present invention refers to an apparatus for the preparation of hot beverages, especially of coffee. Particularly the invention refers to the so-called "Espresso"-machines, which are used more and more in households and which allow to prepare an unlimited number of cups of fresh coffee, one after the other one. Still more particularly, the inventions refers to a coffee machine which includes a housing, a fresh water inlet or a fresh water supply reservoir, a heating means adapted to heat the fresh water, an installation to supply the heated fresh water to a brewing chamber under pressure, said brewing chamber comprising a closure means and an inlet for beverage powder as well as an outlet for beverage, and further including, if appropriate, an installation for pushing out and removing, respectively, the leached-out beverage powder out of the brewing chamber and from the brewing chamber, respectively, as well as including driving and control means for the said installations and means.

2. Prior Art

Such apparatus exist in a wide variety on the market and have a widespread use in households. Similar apparatus having basically the same design are also used commercially, e.g., in restaurants, in canteens and so on. The essential difference between machines for household use and commercially used ones may be seen in the fact, that the dosage and the feed of the coffee powder prior to the preparation of the beverage as well as the removal of the leached-out coffee powder after the preparation of the beverage is performed more or less automatically in the case of commercially used machines. In this way the preparation of the beverage may be performed quicker and thereby with more efficiency.

A fundamental disadvantage, common to both the apparatus used in the houshold as well as the commercially used ones, may be seen in the fact that certain parts of the apparatus are subject to contamination. This is particularly true for those parts of the apparatus which are contacted, on the one hand, by the coffee powder, especially during the brewing of the beverage, and, on the other hand, by the prepared beverage. In the interest of impeccable hygienic conditions it will be necessary to clean the said parts from time to time. While such cleaning procedure involves but some inconvenience and additional work as far as household apparatus are concerned, the operational interruptions during the cleaning process in the case of commercially used apparatus are much more serious and have to be considered. Known apparatus of the commercial kind have to be put completely out of operation and should preferably be disconnected from the mains supply while the contaminated parts are thouroughly cleaned. In most cases the apparatus has to be switched off a certain period in advance in order to enable the parts to be cleaned to cool down at least to a certain degree. The cleaning procedure having been completed, a considerable period of time is required until the apparatus is ready for further use.

OBJECTS OF THE INVENTION

It is a primary object of the present invention to design an apparatus of the kind mentioned in such a way that the aforementioned disadvantages are avoided as far as possible. It is a further object of the present invention to design a coffee machine, especially an espresso machine, in such a way that all parts of the apparatus which are subject to contamination may be cleaned quickly and without effort.

SUMMARY OF THE INVENTION

These and other objects of the invention are met, on the basis of an apparatus as defined hereinbefore, by the fact that at least nearly all parts of the apparatus which are subjected to contamination by the beverage powder or by the beverage are combined to a modular unit, which is removably inserted into the housing of the apparatus, while the remaining parts of the apparatus are fixedly installed in the housing and are adapted to be operatively coupled to the modular unit upon insertion thereof into the housing.

Thereby it is possible that the contaminated parts of the apparatus, by means of removing the modular unit from the housing of the apparatus, are easily accessible and thereby easy to clean, either by rinsing them under flowing water, or by means of a rinsing apparatus. Due to the fact that the parts to be cleaned can be completely separated from the intrinsic apparatus, there is no need to put the apparatus out of operation; the cooling-down and the subsequent warmup period are thereby avoided. In addition, particularly if a rinsing machine is used, a much more intensive cleaning of the contaminated parts is possible.

To receive the parts of the apparatus which are combined to a modular unit, thereby may be provided a module supporting member, in which all parts of the apparatus are combined which are subject to a contamination. This measure favours the maintenance of the apparatus, as only the module supporting member has to be removed from the apparatus in order to effect a thourough cleaning. The module supporting member is preferably made of corrosion resistant material, e.g. of plastic material.

In order to further favour the uncomplicated handling of the apparatus, a further developed embodiment is characterized in that the module supporting member is constructed in the kind of a plug-in module provided with guiding members which are adapted to operatively cooperate with guiding means arranged in the housing.

While it may be sufficient, according to a simple embodiment of the invention, that at least the brewing chamber together with the associated closure means as well as the beverage outlet are combined to a modular unit, it may be advantageous, particularly in connection with commercially used units, which operate more or less automatically, to provide, that additionally the installation for pushing out and removing, respectively, the leached-out beverage powder out of the brewing chamber and from the brewing chamber is included in said modular unit.

In the interest of a simplified construction, it may be advisable that said modular unit, at the one hand, includes first driving means for driving the closure means associated with the brewing chamber, and, at the other hand, second driving means for driving the installation for pushing out and removing the leached-out beverage powder. In that second case said first and second driving means are mechanically coupled and are driven by a common driving element. The result is that the power transmission from a driving motor fixedly mounted within the housing of the apparatus to the plug-in module is effected only at one single position.

A preferred embodiment of the apparatus according to the invention is characterized in that, in the interior of the housing of the apparatus, there are provided, on the one hand fixedly mounted, a fresh water inlet or a fresh water reservoir, a preferably electrically operated heating element for heating the fresh water, an installation for transporting the heated fresh water, preferably in the form of an electrically operated pump, a preferably electrically operated driving motor and the electrical connectors and wires as well as the necessary control and operating means like switches, control elements, thermostats and similar elements, and on the other hand, exchangeably mounted, a plug-in module incorporating the brewing chamber including the associated closure element and the beverage outlet, the installation for pushing out and for removing the leachedout beverage powder as well as first driving means adapted to drive the closure element associated with the brewing chamber and second driving means adapted to drive the installation for pushing out and removing the leached-out beverage powder.

It is assured thereby that all part which conduct electrical current as well as all parts which are not subject to any contamination remain preotected in the housing of the apparatus, while the plug-in module may be easily removed from the housing for the purpose of cleaning. The latter one does not include any moisture sensitive elements, resulting in the fact that no particular precautional measures have to be taken during the rinsing thereof.

In order to enable the parts within the plug-in module to be operated, the apparatus may comprise a clutch means including a driving member connected to the driving motor as well as a driven member mounted to the plug-in module and operatively connected to the first and second driving means, whereby the driving member and the driven member are non-positively connected to each other if the plug-in module is inserted into the housing of the apparatus.

Advantageously the clutch means comprises a check member adapted to block the clutch means in such a way that the driving member and the driven member can be connected to and separated from each other only in a predetermined relative position. Thereby it is assured that the plug-in module may be removed from the housing only after a full operational cycle has been completed and that it may be re-inserted into the housing only if the driving and the driven clutch members have the correct relative position with reference to each other, so that the required operational reliability is warranted.

BRIEF DESCRIPTION OF THE DRAWINGS

In the following there will be described an embodiment of the apparatus according to the invention, with reference to the accompanying drawings, in which.

DESCRIPTION OF A PREFERRED EMBODIMENT

Figure 1:
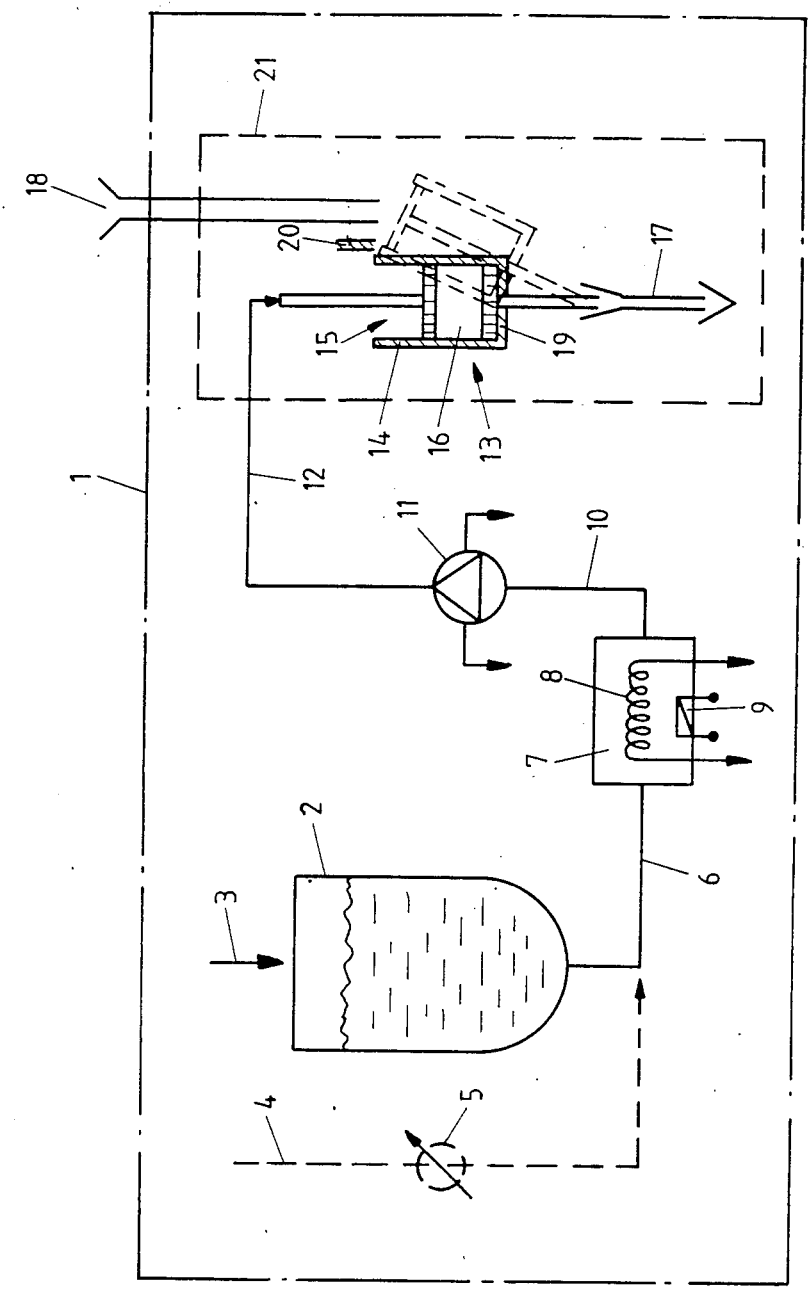
FIG. 1 shows the basic arrangement of the most important elements of a coffee machine and their interconnection.

FIG. 1 shows in a schematic, abstract way, how the most important elements of a coffee machine of the kind referred to are interconnected. In the interior of a housing 1, shown by dashed lines in FIG. 1, there is provided a fresh water reservoir 2 which can be fed with fresh cold water by means of an inlet opening 3. An alternative solution, shown in dashed lines, consists in feeding the fresh water directly by means of a conduit 4 incorporating a valve 5. In any case the fresh water is further transported by a conduit 6 to a heating means 7 which heats the water contained therein by means of a preferrably electrically operated heating element 8. It is understood that there is also provided a thermostat, shown only schematically at 9, which interrupts the heating operation as soon as a predetermined or preselectable heating temperature is reached.

From the heating means 7, the hot water is fed via a conduit 10 to a pump 11, which feeds the heated water by means of a conduit 12 under high pressure to a brewing chamber generally designated by reference numeral 13. The pump 11 is advantageously also electrically operated; the required electrical connections for the pump 11, for the heating means 7 and for further elements still to be discussed in the following are not shown and they do not require any further explanation since the arrangement thereof is within the scope of any person skilled in the art.

The brewing chamber 13, only roughly shown in FIG. 1, comprises a preferably cylindrical sleeve member 14 delimiting the interior of the brewing chamber, which may be closed by means of a closure element 15. Thereby a chamber 16 is defined which serves to receive the beverage powder. The heated water is fed under pressure via conduit 12 into the chamber 16, the beverage powder contained therein is brewed and the finished beverage escapes from the chamber 16 through the outlet 17. A beverage powder inlet 18, to be further explained hereinafter, serves for feeding the beverage powder to the chamber 16.

In order to enable the brewing chamber 13 to be discharged after the preparation of the beverage, a displaceable piston 19 is disposed within the chamber 16. A relative displacement between the sleeve member 14 and the piston 19 effects a pushing-out of the so-called powder cake out of the chamber 16. This operation may be accomplished by retracting the closure element 15 and displacing the piston upwardly. Thereafter the brewing chamber 13 may be pivoted to the position shown in dashed lines, whereby the powder cake is removed by means of a strip-off member 20 mounted in the region of the open top of the chamber 16. The powder cake may then be discharged into a receiving container not shown in FIG. 1. The brewing chamber 13 being in the pivoted position shown by dashed lines, its opening is below the mouth of the feeding channel 18 for fresh beverage powder, so that the chamber 16 may be filled with fresh beverage powder as soon as the piston 19 has been retracted again into its rest position. Thereafter the brewing chamber 13 will be pivoted back in its original position, shown by solid lines in FIG. 1, the closure element 15 is displaced downwardly to close the brewing chamber 13 and hot water is fed under pressure to the chamber 16 via conduit 12.

It is understood that, essentially, the brewing chamber 13 together with the auxiliary elements associated therewith as well as the means for pushing-out and removing the powder cake are subject to contamination by the beverage powder or the prepared beverage. The remaining elements of the apparatus, particularly the fresh water feeding circuit, the heater, the pump as well the associated conduits are not subject to any severe contamination, but need to be cleaned only after extended periods of use. This is the reason why the brewing chamber together with the associated auxiliary elements as well as the means for pushing-out and removing the powder cake are mounted within a removably arranged plug-in module 21; the purpose is that these elements, if contaminated, may be removed effortlessly from the apparatus in order to be cleaned. In FIG. 1 the plug-in module is schematically shown as a dashed border line around the relevant elements; a practical embodiment will be further explained hereinafter.

Figure 2:
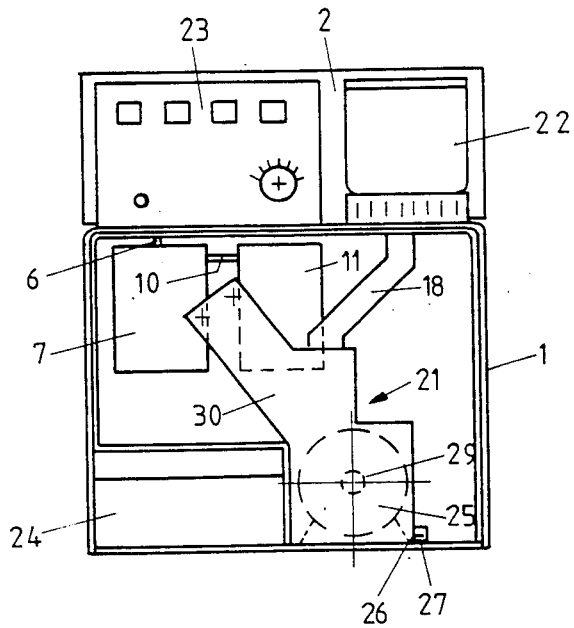
FIG. 2 shows a schematic front view of a partially opened coffee machine with inserted plug-in module.

A schematic view of an embodiment of a coffee machine according to the invention is shown in FIG. 2, the frontal cover thereof being removed. In or on the top of a housing 1 there is mounted a fresh water reservoir 2, arranged behind a coffee mill 22 as well as behind a control unit 23. The reservoir 2 is connected to a heater 7 by means of a conduit 6, and the heater is connected to a pump 11 via a conduit 10. The feeding channel 18 connects the output of the coffee mill 22 to the plug-in module 21, ending in the region of the upper side of the brewing chamber 13 in its pivoted position, thereby enabling freshly milled coffee powder to be discharged into the chamber 16 of the brewing chamber 13. There is further provided a receiving container 24 for the pushed-out powder cake, as well as an electric motor 25 adapted to drive the elements mounted within the plug-in module 21, as will be further explained hereinafter.

The control unit 23 contains all elements necessary for controlling and putting the coffee machine into operation, particularly the control switches, pilot lamps, if necessary relais etc. The design and construction of these elements has not to be discussed further here, as they are well known in the art. In addition, all electrical connections are contained in the interior of the housing 1 and are fixedly wired, particularly the electrical supply lines to the coffee mill 22, to the heater 7, to the thermostat 9, to the pump 11 and to the driving motor 25. These wire connections are not shown in FIG. 2 as well, since the design thereof should be clearly evident to any person skilled in the art.

Figures 3, 3A:
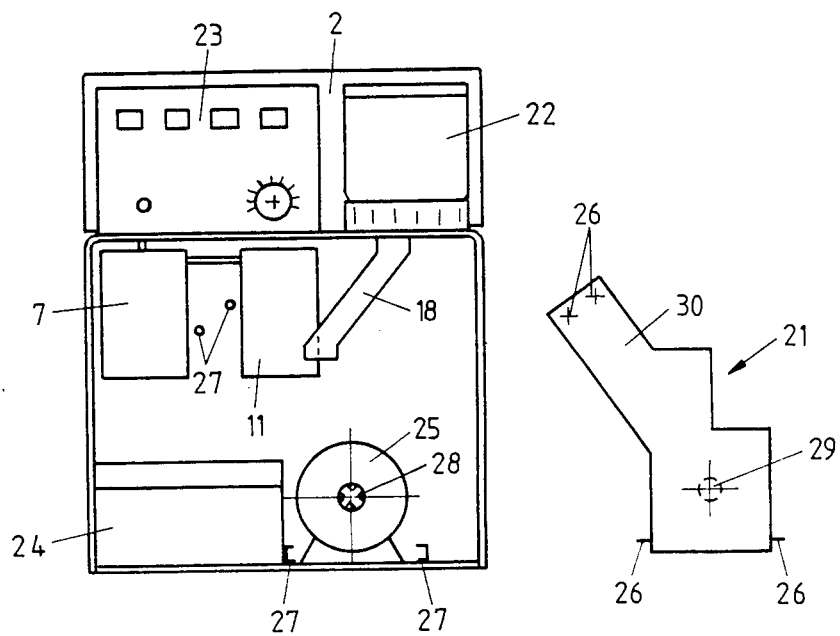
FIG. 3 shows a schematic front view of a partially opened coffee machine with removed plug-in module.
FIG. 3a shows a schematic view of a plug-in module associated with the machine of FIG. 3.

FIG. 3 shows a schematic front view of a partially opened coffee machine similar to FIG. 2, but with the plug-in module 21 removed; the latter one is schematically shown in FIG. 3a. Particularly clear from FIGS. 3 and 3a is the fact that the plug-in module 21 is equipped with guiding members 26 which cooperate with corresponding guiding elements 27 mounted in the interior of the housing 2. These guiding members 26 and guiding elements 27 serve to define the position of the plug-in module 21 in the interior of the housing 1 in order to enable the module 21 to be easily inserted into the apparatus and to be removed therefrom, respectively, and further to provide a reliable coupling between the plug-in module 21 and the housing 1.

It may be further seen from FIG. 3 that the motor 25 is provided with a driving member 28 mounted on its driving shaft. This driving member 28 is part of a clutch means which further includes a driven member 29, shown by dashed lines in FIG. 3a, adapted to non-positively engage the driving member 28 mounted on the motor 25 as soon as the plug-in module 21 is inserted into the housing 1. The driven member 29 serves to drive all the members and installations provided in the plug-in module 21, as will be explained in the following.

Advantageously the clutch means includes a check member, not further shown in the drawings, which serves to inhibit the engagement of the clutch means in such a way that the driving member 28 and the driven member 29 may be coupled together and disengaged from each other, respectively, only if they have a certain, predetermined relative position with reference to each other. Preferably an initial or starting position is defined, i.e. a position of the apparatus after a full operation cycle, whereby the powder cake has been pushed-out and removed, but the fresh beverage powder has not yet been discharged into the brewing chamber; a removal of the plug-in module 21 from the housing 1 shall be possible only in such initial or starting position. Correspondingly an insertion of the module 21 into the housing shall be possible only in said initial or starting position. Thereby it may be assured that the apparatus always operates well, insofar as the operator is forced to correctly position the driven element 29, which might have been unintendedly rotated during the cleaning process, prior to reinserting the plug-in module 21 into the housing 1 in order to ensure the required non-positive engagement between driving member 28 and driven member 29.

Figure 4:
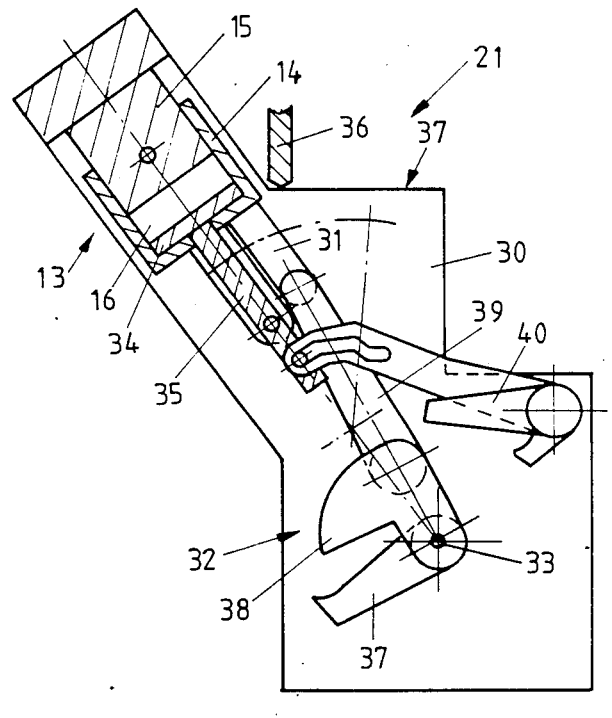
FIG. 4 shows a partially sectioned side view of an embodiment of the plug-in module.

FIG. 4 shows a partially sectioned side view of an embodiment of the plug-in module 21. It embodies a modular unit, including essentially the brewing chamber together with closure element and beverage outlet, as well as the means for pushing-out and removing the powder cake from the brewing chamber and finally the driving and control means for the operation of the brewing chamber and the pushing-out means. The aforementioned elements are received by two essentially panel-like supporting member 30, only one thereof being shown in FIG. 4. These supporting members consist advantageously of corrosion resistant material, e.g. of heat resistant plastic material or of stainless steel.

The sleeve 14 delimiting the brewing chamber 13 is mounted between the two supporting members 30, and the closure element 15, fixedly mounted in the present example, engages the interior of the sleeve 14. The sleeve 14 is connected to a crank mechanism 32 by means of a lever 31, with the result that upon rotation of the shaft 33 a longitudinal displacement of the sleeve 14 takes place, the chamber 16 adapted to receive the beverage powder thereby being opened and closed.

Furthermore, in the interior of the sleeve 14, there is provided a push-out piston 34, the connecting rod 35 thereof being operatively coupled to the crank mechanism 32 as well. Due to the kinematic conditions of the crank mechanism 32, which will not be further discussed within the scope of the present invention, a relative displacement of the piston 34 with reference to the sleeve 14 will take place during every operational cycle of the apparatus, with the effect that the powder cake is pushed-out of the brewing chamber. Simultaneously the sleeve 14 is forced to a pivoting and downward movement, whereby it will pass a strip-off member 36 during the pivoting movement in clockwise direction. Finally it will reach a final, fully pivoted position, where the brewing chamber is in an upright, essentially vertical position. Now the opened chamber 16 lies below the surface 37 and thereby directly below the outlet mouth of the beverage powder feeding channel 18.

The operating elements required for this procedure, in the form of levers 37', 38, 39 and 40, are all operatively coupled to the driving shaft 33, with the result that only one single powder coupling point is required for the operation of the apparatus, i.e. for the operation of the brewing chamber 13 (closing and opening; pivoting movement) and for the operation of the powder cake push-out means. This powder coupling point is constituted, in the present example, by the driven member 29. It can be coupled to the driving member 28 of the electric motor 25 in a very simple way as hereinbefore explained.

Preferably the essential members and elements of the brewing chamber and the strip-off installation, received by the supporting elements of the plug-in module, are also made of a heat resistant plastic material, or, if required, of stainless steel. The design of the driving and operating members 35 and 37' to 40 as well as the kinematic design thereof will not be further discussed within the scope of the present invention, since these elements are not the essential objects of the present invention.

What we claim is:

1. An apparatus for the preparation of hot beverages, particularly of coffee, comprising a housing, in the interior of the housing of the apparatus being provided, fixedly mounted, a fresh water inlet or a fresh water reservoir, a heating element for heating the fresh water, means for transporting the heated fresh water under pressure, and exchangeably mounted, a plug-in module incorporating a brewing chamber including an associated closure element and a beverage outlet, a means for pushing out and for removing leached-out beverage powder and a first driving means for driving said closure element associated with said brewing chamber, a second driving means for driving said means for pushing out and removing the leached-out beverage powder and clutch means including a driving member connected to said driving means and a driven member mounted to said plug-in module and operatively connected to said first and second driving means cooperating with said driving member and said driven member to be non-positively connected to each other if said plug-in module is inserted into said housing of the apparatus.

2. The apparatus according to claim 1 wherein said heating element is electrically operated and said means for transporting the heated fresh water under pressure and includes an electrically operated pump, an electrically operated driving motor, including control means for controlling the temperature of the element and the operation of said pump.

3. An apparatus according to claim 2, in which said clutch means comprises a check member adapted to block the clutch means in such a way that said driving member and said driven member can be connected to and separated from each other only in a predetermined relative position.

4. An apparatus for the preparation of hot beverages, particularly of coffee, including a housing, at least one of a fresh water inlet and a fresh water supply reservoir, a heating means for heating fresh water, a brewing chamber, means to supply heated fresh water to said brewing chamber under pressure, said brewing chamber comprising a closure means and an inlet for beverage powder and an outlet for beverage, and further including means for pushing out and removing, leached-out beverage powder from said brewing chamber, including driving and control means for said heating means, said brewing chamber, said supply means, said closure means and said pushing out and removing means; a modular unit wherein said brewing chamber, said closure means and the beverage outlet, which are subject to contamination by at least one of the beverage powder and the beverage, are combined to form said modular unit, said modular unit being removably insertable into the housing of the apparatus, while the remaining parts of the apparatus are fixedly installed in the housing and are operatively coupled to the modular unit upon insertion thereof into the housing.

5. An apparatus according to claim 4, in which said modular unit additionally includes first driving means for driving the closure means associated with the brewing chamber.

6. An apparatus according to claim 4, in which said modular unit additionally includes second driving means for driving the installation for pushing out and removing the leached-out beverage powder.

7. An apparatus according to claim 4 wherein said modular unit includes a first driving means for driving the closure means associated with the brewing chamber and a second driving means for driving the installation for pushing out and removing the leached-out beverage powder, said first and second driving means being mechanically coupled and driven by a common driving element.

8. An apparatus for the preparation of hot beverages, particularly of coffee, including a housing, at least one of a fresh water inlet and a fresh water supply reservoir, a heating means adapted to heat the fresh water, a brewing chamber, means to supply the heated fresh water to said brewing chamber under pressure, said brewing chamber comprising a closure means and an inlet for beverage powder as well as an outlet for beverage, and further including means for pushing out and removing, leached-out beverage powder from the brewing chamber; driving and control means for said heating means, said brewing chamber, said supply means, said closure means and said pushing out and removing means; a modular unit including said brewing chamber said closure means, the beverage outlet, and said means for pushing out and removing the leached out beverage powder from the brewing chamber, which all are subject to contamination by at least one of the beverage powder and the beverage; said modular unit being removably insertable into the housing of the apparatus, while the remaining parts of the apparatus are fixedly installed in the housing and are operatively coupled to the modular unit upon insertion thereof into the housing.

9. An apparatus according to claim 8, in which said modular unit additionally includes first driving means for driving the closure means associated with the brewing chamber.

10. An apparatus according to claim 8, in which said modular unit additionally includes second driving means for driving the installation for pushing out and removing the leached-out beverage powder.

11. An apparatus according to claim 8 wherein said modular unit includes a first driving means for driving the closure means associated with the brewing chamber and a second driving means for driving the installation for pushing out and removing the leached-out beverage powder, said first and second driving means being mechanically coupled and driven by a common driving element.

* * * * *